Figures 1, 2:
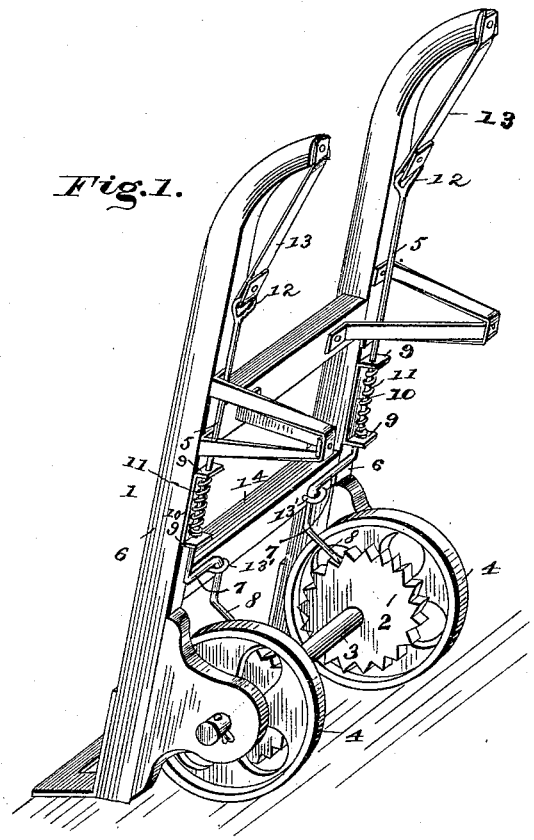

(No Model.)

J. F. DE JOURNETTE.
BRAKE LOCK FOR TRUCKS.

No. 496,151. Patented Apr. 25, 1893.

Witnesses
J. Ulke, Jr.
N. J. Riley

Inventor
J. F. DeJournette.
By his Attorneys,
C. A. Snow & Co.

UNITED STATES PATENT OFFICE.

JOHN F. DE JOURNETTE, OF MURPHY, NORTH CAROLINA.

BRAKE-LOCK FOR TRUCKS.

SPECIFICATION forming part of Letters Patent No. 496,151, dated April 25, 1893.

Application filed July 21, 1892. Serial No. 440,789. (No model.)

*To all whom it may concern:*

Be it known that I, JOHN F. DE JOURNETTE, a citizen of the United States, residing at Murphy, in the county of Cherokee and State of North Carolina, have invented a new and useful Brake-Lock for Trucks, of which the following is a specification.

The invention relates to improvements in brakes for hand trucks.

The object of the present invention is to provide simple and effective means for locking the wheels of a hand truck against rotation while the truck is being loaded to prevent a truck accidentally slipping from under a load.

A further object of the invention is to enable the wheels to be readily unlocked by the operator in grasping the handles of the truck.

The invention consists in the construction and novel combination and arrangement of parts hereinafter fully described, illustrated in the accompanying drawings and pointed out in the claims hereto appended.

In the drawings—Figure 1 is a perspective of a truck constructed in accordance with this invention. Fig. 2 is a longitudinal sectional view.

Like numerals of reference indicate corresponding parts in both the figures of the drawings.

1 designates a truck having on each side a ratchet wheel 2 which is mounted on the axle 3 and arranged on the inner face of the adjacent wheel 4 and has its teeth engaged by a spring actuated rod 5 extending longitudinally of the adjacent side bar 6, and provided adjacent to the truck wheel with an inward bend 7 to bring the engaging portion 8 of the rod opposite the ratchet wheel or disk 2. The rod is arranged in guide openings of flanges 9 of a plate 10 which is secured to the lower edge of the side bar, and a spiral spring 11 is disposed on the rod and arranged between the flanges and has one end bearing against a shoulder of the rod, and its other end bearing against the rear flange, whereby the rod is moved forward in engagement with the ratchet wheel. The rear end of the rod is provided with an eye 12 to which is secured one end of a strap 13 which has its other end secured to the end of the handle portion of the side bar; and the strap is arranged beneath the handle portion of the bar, and is adapted to be pressed up against the same by the operator in grasping the handle to withdraw the engaging portion of the rod out of engagement with the ratchet wheel or disk when it is desired to move the truck. The engaging portion of each rod is arranged in a guide 13' of the cross-bar 14 of the truck frame. By this construction it will be seen that when the truck is being loaded the wheels thereof are positively locked against rotation, thereby preventing the truck slipping from under a load. It will also be apparent that the straps which are connected with the rods are arranged directly beneath the handle portions of the side bars, and that the rods are withdrawn from engagement with the ratchet wheels or disks by the operator in grasping the handles.

What I claim is—

1. The combination with a truck, of a ratchet wheel provided on its periphery with ratchet teeth connected rigidly with the truck wheel, and a spring actuated bar extending along the side bar and mounted thereon and provided near its front end with an inward angular bend and inclining downward and forward and engaging the ratchet wheel, substantially as described.

2. The combination with a truck, of a ratchet wheel connected rigidly with the truck wheel, a spring actuated rod extending longitudinally of the side bar and having its front end engaging the ratchet wheel, and a strap having one end secured to the rear end of the side bar and its other end attached to the adjacent end of the rod, said strap being arranged beneath the handle portion of the side bar whereby when the handle portion is grasped the strap will be drawn to disengage the rod from the ratchet wheel, substantially as described.

In testimony that I claim the foregoing as my own I have hereto affixed my signature in the presence of two witnesses.

JOHN F. DE JOURNETTE.

Witnesses:
M. F. DE JOURNETTE,
L. P. GILBERT.